(12) United States Patent
Malhotra

(10) Patent No.: US 8,072,888 B2
(45) Date of Patent: Dec. 6, 2011

(54) CONTROLLING CONGESTION IN A PACKET SWITCHED DATA NETWORK

(75) Inventor: Richa Malhotra, Hengelo (NL)

(73) Assignee: Alcatel Lucent, Paris (FR)

( * ) Notice: Subject to any disclaimer, the term of this patent is extended or adjusted under 35 U.S.C. 154(b) by 191 days.

(21) Appl. No.: 12/315,472

(22) Filed: Dec. 3, 2008

(65) Prior Publication Data

US 2009/0147685 A1 Jun. 11, 2009

(30) Foreign Application Priority Data

Dec. 6, 2007 (EP) ..................................... 07254729

(51) Int. Cl.
*G01R 31/08* (2006.01)
(52) U.S. Cl. ........................................ 370/236; 370/235
(58) Field of Classification Search ................... 370/235, 370/231, 230, 229, 230.1, 389, 236
See application file for complete search history.

(56) References Cited

U.S. PATENT DOCUMENTS

| | | | | |
|---|---|---|---|---|
| 5,901,140 A | * | 5/1999 | Van As et al. | 370/236 |
| 6,108,306 A | * | 8/2000 | Kalkunte et al. | 370/235 |
| 7,372,814 B1 | * | 5/2008 | Chiruvolu et al. | 370/235 |
| 2002/0136163 A1 | | 9/2002 | Tetsuya et al. | |
| 2004/0081092 A1 | * | 4/2004 | Rhee et al. | 370/230 |
| 2005/0243722 A1 | | 11/2005 | Liu et al. | |
| 2006/0215550 A1 | * | 9/2006 | Malhotra | 370/229 |

FOREIGN PATENT DOCUMENTS

WO    WO 2007047865    4/2007

* cited by examiner

*Primary Examiner* — Chi Pham
*Assistant Examiner* — Kouroush Mohebbi
(74) *Attorney, Agent, or Firm* — Carmen Patti Law Group, LLC

(57) ABSTRACT

A method of controlling congestion in a packet switched network includes transmitting a pause message to a node upstream of a congested node to instruct it to cease sending for a period of time. The congested node also sends information to the upstream node informing it of the buffer size required to relieve congestion. If the buffer capacity of the upstream node is greater than or equal to the signalled amount required, no further action is taken. If the buffer capacity of the upstream node is less that the required amount, it in turn sends a pause message to a node upstream of it, together with an indication of the required buffer size to reduce congestion, taking into account the amount available from the sending nodes.

15 Claims, 4 Drawing Sheets

CONTROLLING CONGESTION IN A PACKET SWITCHED DATA NETWORK

FIELD OF THE INVENTION

The present invention relates to a method of controlling congestion in a packet switched data network and to a network using such a method.

BACKGROUND OF THE INVENTION

Optimization of buffer sizes in routers, switches or bridges is difficult to achieve. Excessively large buffers lead to higher costs for those network elements that include them and also to performance issues such as high latency. In contrast, small buffers are cheaper but also increase packet loss for unpredictable bursty traffic. For higher layer applications like Transmission Control Protocol ("TCP"), used, for example, for file transfers and web-browsing, packet loss triggers a reduction in traffic sending rate. This in turn causes lower throughput and greater file download and response times. The effect of buffer size on TCP performance is dependent on a number of parameters and on the specific circumstances, taking into account traffic and network configuration. A paper by D. Wischik and N. McKeown "Part 1: Buffer Sizes for Core Routers", ACM SIGCOMM Computer Communication Review, Volume 35, Number 2, July 2005, hereby incorporated by reference, discusses some of the considerations involved in determining suitable buffer sizes.

Ethernet back-pressure is a hop-by-hop congestion control mechanism. In time of congestion, where a node has insufficient buffer capability to accommodate all the traffic that is being sent, the congested node can signal its upstream neighbour to stop transmitting data using a PAUSE message, as set out in IEEE Standard 802.3-2005 at 31B.3 "Detailed specification of PAUSE operation". The PAUSE message instructs the sending upstream node to stop transmitting for set period of time. If, as a result of temporarily stopping its transmission, the upstream node also becomes congested, it can also transmit a PAUSE message to the node upstream from it, and so on. Thus, when there is congestion, it may lead to utilizing buffers at multiple nodes to hold packets. There is a risk that, under some conditions, utilizing the PAUSE mechanism may jam an entire network as the PAUSE instruction propagates upstream over multiple nodes.

BRIEF SUMMARY

According to a first aspect of the invention, a method of controlling congestion in a packet switched data network, comprises the steps of: detecting congestion at a first node of the network; when congestion is detected, sending a pause message to a second node, upstream from the first node, to stop transmitting data to the first node for a period of time, and sending information to the second node indicating the amount of buffer space required to relieve congestion; and, where the buffer capacity of the second node is less than that required, acting to reduce the congestion. The pause message may be a PAUSE message in accordance with Ethernet standards, but the invention is applicable to networks using other operating protocols. It is only necessary for the widest scope of the invention that the pause message results in the transmission of data from a sending node to be halted for a period of time. Use of the invention provides a way to control the Ethernet back-pressure congestion control mechanism and also to provide flexible buffer space for nodes in a packet-switched network.

The second node may drop packets to reduce congestion. In another variant in accordance with the invention, where the buffer capacity of the second node is less than that required, a pause message is sent to a third node, upstream from the second node, thus acting to reduce the congestion. Where the buffer capacity of the second node is also less than that required, information may be sent to the third node indicating the amount of buffer space required taking into account the buffer capacity of the second node. As the required buffer size is modified depending on the capacity of a number of nodes involved, and a pause message is transmitted upstream only when a particular node in a chain is unable to meet that required capacity, the pause message is less likely to spread in an uncontrolled manner. Thus, by using the invention, there is a reduced likelihood that the entire network will become jammed.

The pause messages may themselves also include information indicating the amount of buffer space required. Where the pause message is a PAUSE message in accordance with Ethernet protocols, it may include bits additional to the frame structure specified in IEEE 802.3x standard which are used to indicate the existence of congestion and the amount of buffer capacity required.

In another method in accordance with the invention, information indicating the amount of buffer space required is sent in a different type of message than a pause message. Thus, the pause message could be sent separately to the message indicating a required buffer capacity.

The existence of a congestion state at a node may be explicitly or implicitly signalled to an upstream node. By sending a message with a buffer size requirement, either as part of the pause message or accompanying the pause message but separate therefrom, the upstream node may deduce that congestion has been noted at the downstream node. However, in some methods in accordance with the invention, the existence of congestion is explicitly set out, for example, by including message bits dedicated to congestion information. Such congestion information may be merely an indication of whether or not congestion exists. In other cases, the type of congestion involved may be included by appropriate selection of one from a number of congestion codes. For example, it may be useful to indicate that many TCP connections are causing the congestion and that they are synchronized, with packet loss affecting them all at the same time. Another type of congestion may occur where there is only partial synchronization. In another type, the presence of persistent flows may lead to congestion.

In another method in accordance with the invention, a management system may also be involved. The management system may have an overview of the network architecture, traffic flow and processing capability to assess the buffer size required to ease congestion at a congested node or nodes. A congested node may send a message to the management system indicating the existence of congestion, possibly also including an indicator of the type of congestion it is experiencing. The management system may then reply to the congested node with at least one of an indication of the buffer size and the network path required to relieve congestion, which may be dependent on the type of congestion concerned. The network path may, for example, be designated by the node IDs over which the congestion causing flow passes. In this case the pause message might be directed only along this path. The management system may also send an indication of to which upstream node the pause message and indication of buffer size should be sent by the congested node.

According to another aspect of the invention, a data network has a congestion control mechanism in accordance with the method disclosed above.

BRIEF DESCRIPTION OF THE DRAWINGS

Some embodiments of the present invention will now be described by way of example only, and with reference to the accompanying drawings, in which.

DETAILED DESCRIPTION

Figure 1:
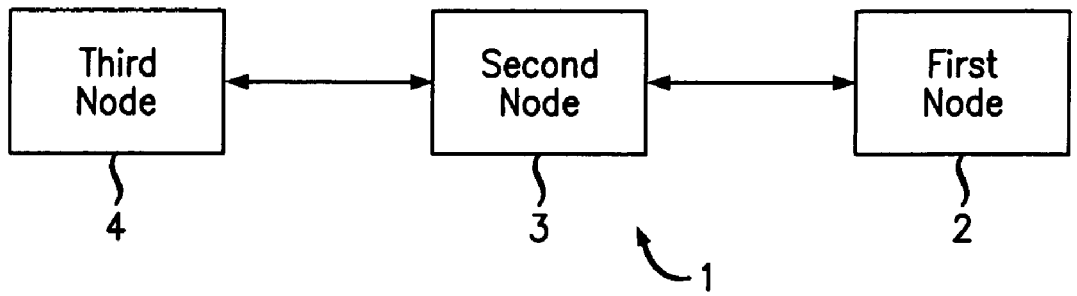
FIG. 1 schematically illustrates a data network in accordance with the invention.

With reference to FIG. 1, a data network 1 operating in accordance with the Ethernet protocol includes a plurality of nodes 2, 3 and 4, each of which includes a buffer at which frames are temporarily stored. Each node has an indicator for detecting the amount of the buffer capacity that is occupied and the amount which is free and available to be used to hold incoming data packets. The nodes may be routers, switches, bridges, or other network elements where data packets are required to be held. The first node 2 is downstream of the second node 3, receiving data packets therefrom. Similarly, the second node 3 is downstream of a third node 4. In practice, a node may connect to more than one other node in an upstream or downstream direction.

Figure 2:
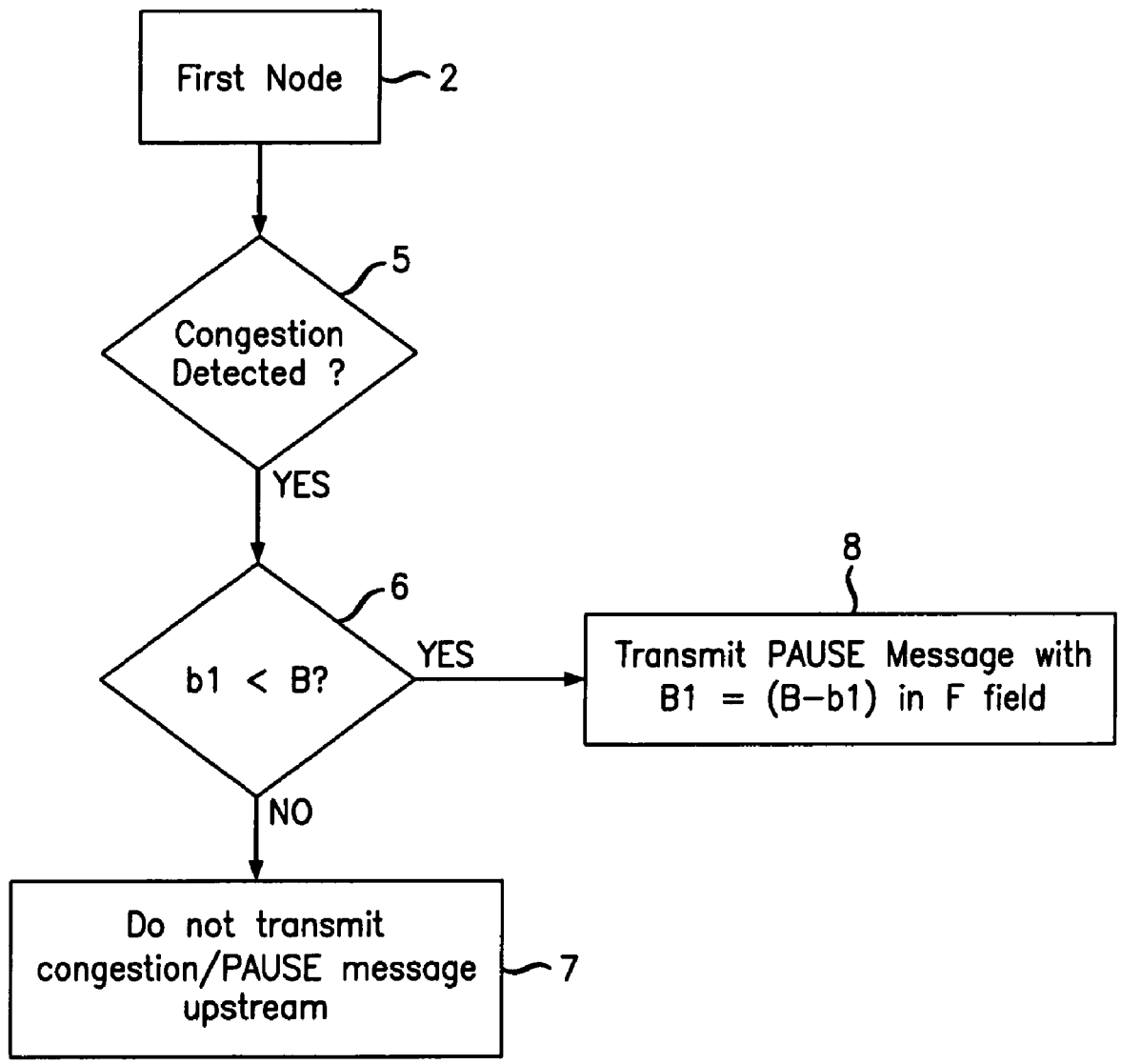
FIG. 2 schematically illustrates steps of a method in accordance with the invention associated with a first node of the network of FIG. 1.

The first node 2 receives frames, or data packets, from the second node 3. If these are transmitted at too great a rate, the first node 2 becomes congested because there is insufficient buffer space remaining at the first node 2. The existence of congestion may be determined by a number of different methods. For example, it may be selected to exist when the first node is unable to receive another data packet because the buffer has insufficient space to accommodate even one additional packet, or the existence of congestion could be based on the rate of receipt of incoming packets, or by calculations based on traffic management principles, or if the queue occupancy exceeds a certain threshold or by measuring average queue occupancy and if this average exceeds a certain pre-specified threshold When congestion is detected at the first node 2, as shown at 5 in FIG. 2, the amount of buffer space B required to resolve the congestion condition is compared at 6 to the buffer capacity b1 of the first node 2. The value of B is selected so as to be optimized to deal with network congestion and is a fixed value. In other alternative methods in accordance with the invention the value of B is variable. If the buffer capacity b1 of the first node is greater than or equal to B, then no action is taken, as shown at 7. However, if the buffer capacity b1 is less than B, then a PAUSE message is transmitted to the second node 3 upstream of the first node 2, as shown at 8. The PAUSE message instructs the second node 3 to stop transmitting to the first node 2 for a fixed period of time. The PAUSE message is in accordance with IEEE 802.3-2005 and also includes additional bits in the F field to indicate a new value B1, where B1=B−b1.

Figure 3:
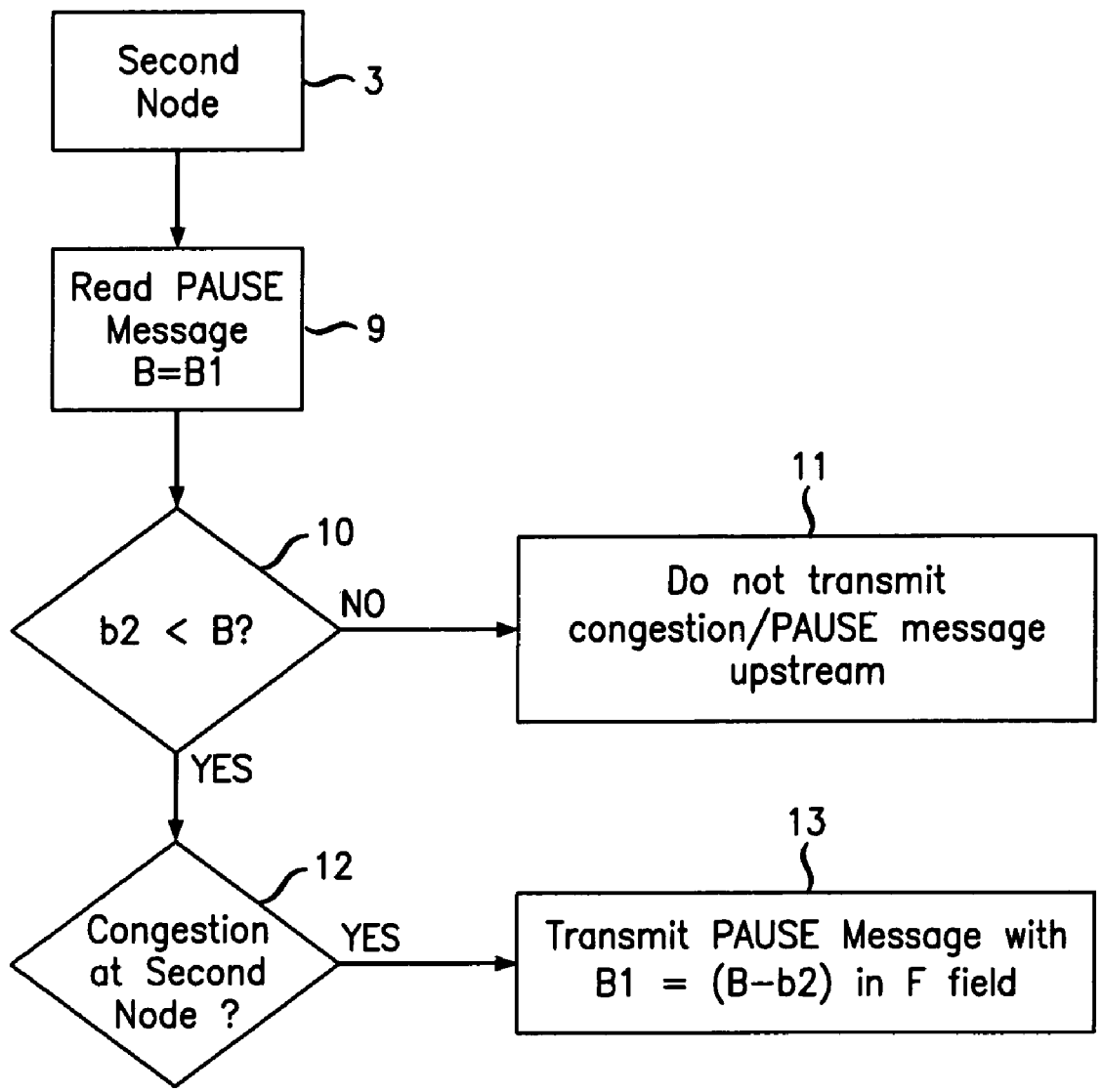
FIG. 3 schematically illustrates steps of a method in accordance with the invention associated with a second node of the network of FIG. 1.

The second node 3 receives the PAUSE message and reads it, as shown at 9 of FIG. 3. It re-sets the value B to be B1, thus taking into account the capacity available at the first node 2. At 10, the second node compares the new value of B with its own buffer capacity b2. If the buffer capacity b2 is greater than, or equal to, B, then no further action is taken, as shown at 11. If, however, b2 is smaller than B, the second node then determines if it is congested at 12. If it is congested, it sends a PAUSE message upstream to the third node 4, including a new value for B1, that is B1=B−b2, in its F field, as shown at 13.

The mechanism is repeated for other upstream nodes until congestion is relieved.

In the method described above with reference to FIGS. 2 and 3, there is no specific mention that a congestion state exists, as this is indicated by the inclusion of a value for B1 in the PAUSE message. However, in other methods, an indication that there is congestion is also transmitted with the PAUSE message. This can be useful where different types of congestion conditions may exist and it is desired to differentiate between them. The value of B1 may be selected depending on the type of congestion involved.

Figure 4:
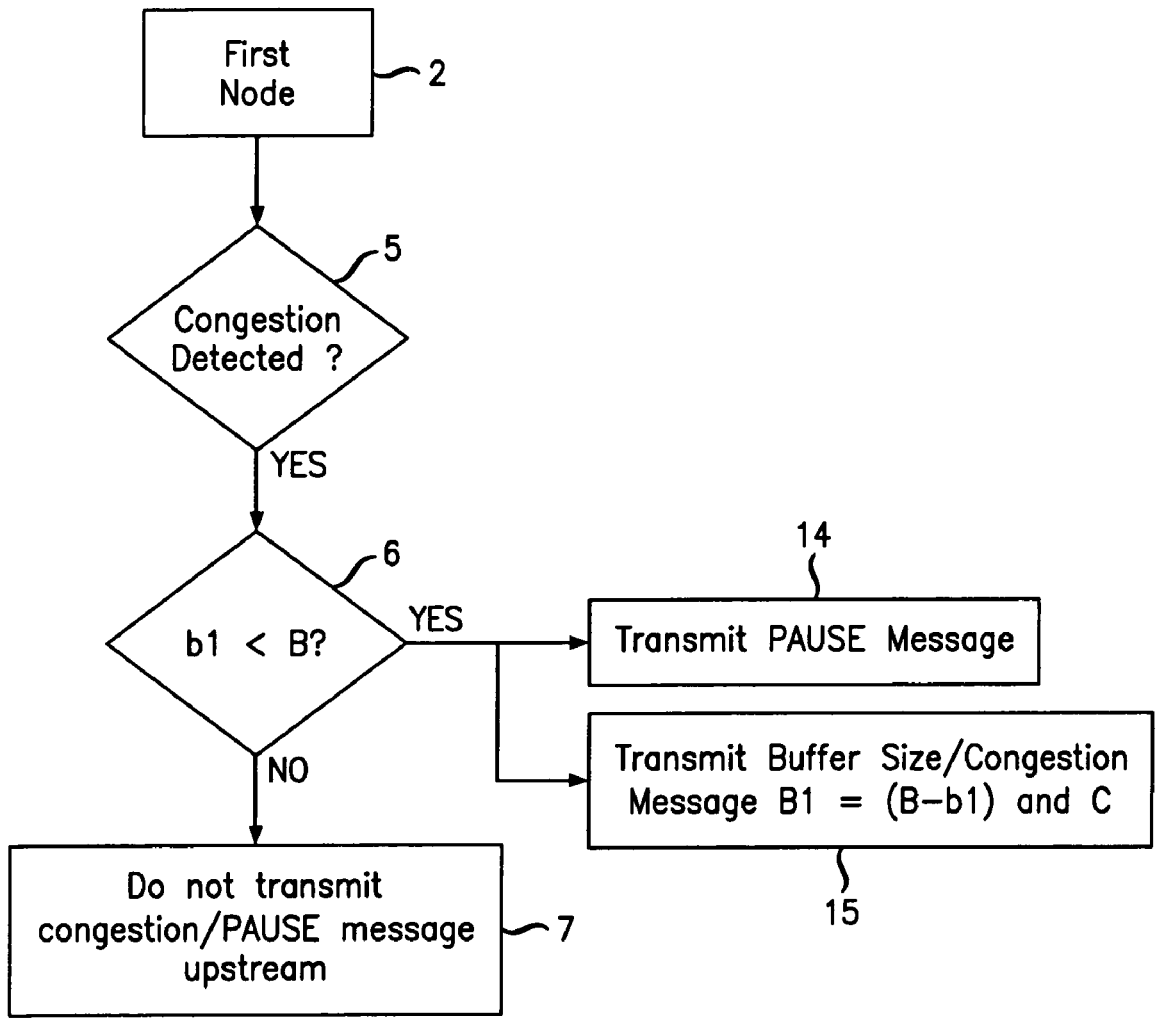
FIG. 4 schematically illustrates steps of another method in accordance with the invention associated with a first node of the network of FIG. 1.

In another method in accordance with the invention, as shown in FIG. 4, the PAUSE message transmitted at 14 contains no information relating to buffer size or congestion. A separate message is transmitted from the first node 2 to the second node 3 at 15, and this include the buffer size B and also in this particular method, a congestion type indicator C.

Figure 5:
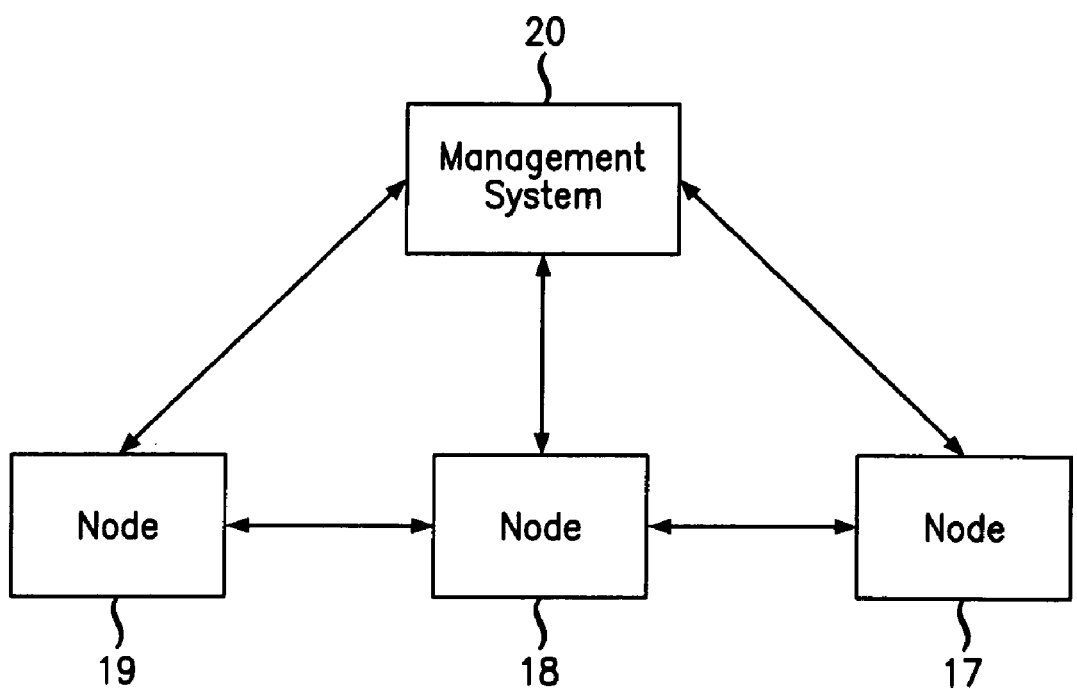
FIG. 5 schematically illustrates another data network in accordance with the invention.

With reference to FIG. 5, a data network 16 includes nodes 17, 18 and 19 and also a management system 20. In one method in accordance with the invention, the first node 17 sends a congestion alert message to the management system 20. The management system 20 has an overview of the network topology, traffic flow on its path and so on. The management system 20 signals back to the congested node the value of B, the buffer space required for optimal performance. The value of B may be adjusted to take into account the congestion characteristics at the congested node. The management system may also specify an upstream node to which a PAUSE message is to be sent by the first node 17. The management system 20 may also signal back to the first node 17 as to what type of congestion exists, for onward transmission.

Although in the example described above, reference is made to PAUSE messages in accordance with Ethernet protocols, it is not essential to the invention that the method is implemented in an Ethernet arrangement. The pause message may be of any suitable structure conveying information to a node concerning stopping transmission of data packets for a period of time. Alternatively, the management system might also specify the entire network path consisting of a string of nodes and their IDs over which the problem causing traffic flow passes. In this case the PAUSE message will be directed to only nodes on this specified path. In order to realize the method like this the management system could send a special message to the congested node with the IDs (Ethernet MAC addresses or IP addresses) of the nodes involved.

The present invention may be embodied in other specific forms, and carried out by other methods, without departing from its spirit or essential characteristics. The described embodiments and methods are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method of controlling congestion in a packet switched data network, comprising the steps of:
   detecting congestion at a first node of the packet switched data network via one or more techniques, and one of the techniques is based on a rate of receipt of incoming packets;
   when the congestion is detected, sending a pause message to a second node, upstream from the first node, to stop a transmission of data to the first node for a period of time, and sending information to the second node that indicates an amount of buffer space required to relieve the congestion;
   and, when a buffer capacity of the second node is less than that required, acting to reduce the congestion.

2. The method of claim 1, further comprising the step of dropping, via the second node, packets to reduce congestion.

3. The method of claim 1, further comprising the step of, when the buffer capacity of the second node is less than that required, sending a pause message to a third node, upstream from the second node, to reduce the congestion.

4. The method of claim 3, further comprising the step of, when the buffer capacity of the second node is less than that required, sending information to the third node to indicate the amount of buffer space required that takes into account the buffer capacity of the second node.

5. The method of claim 1, wherein the pause messages are PAUSE messages in accordance with Ethernet protocols.

6. The method of claim 1, wherein the pause messages include information that indicates the amount of buffer space required.

7. The method of claim 6, wherein the pause messages are PAUSE messages in accordance with Ethernet protocols, and a PAUSE message frame in accordance with IEEE 802.3x includes additional bits used to indicate an existence of congestion and the amount of buffer capacity required.

8. The method of claim 1, further comprising the step of sending information that indicates the amount of buffer space required in a different type of message than a pause message.

9. The method of claim 1, further comprising the step of sending information that indicates an existence of congestion from the first node to a traffic management system;
   wherein the traffic management system is operable to inform the first node of at least one of the amount of buffer space required to relieve the congestion and the packet switched data network path required to relieve the congestion.

10. The method of claim 9, wherein, when the first node is informed of said packet switched data network path, the pause messages are directed only along said packet switched data network path.

11. The method of claim 1, wherein the amount of buffer space required to relieve the congestion is dependent on a type of the congestion.

12. A packet switched data network comprising:
    a first node;
    a second node upstream of the first node;
    a detector to detect congestion at the first node;
    a pause message generator; and
    a congestion control mechanism, wherein when the detector detects congestion at the first node based on a rate of receipt of incoming packets, the pause message generator sends a pause message to the second node to stop transmission of data to the first node for a period of time, and an indication is sent to the second node about an amount of buffer space required to relieve congestion; and, when the buffer capacity of the second node is less than that required, the congestion control mechanism is operable to reduce the congestion.

13. The method of claim 1, further comprising the step of comparing the amount of buffer space required to resolve the congestion to a buffer capacity of the first node prior to the step of sending a pause message to a second node.

14. The method of claim 1, wherein another technique to detect the congestion is when the first node is unable to receive another data packet because the buffer has insufficient space to accommodate even one additional packet.

15. The method of claim 1, wherein another technique to detect the congestion is to measure an average queue occupancy and determine whether the average queue occupancy exceeds a certain pre-specified threshold.

* * * * *